Aug. 17, 1926.

1,596,237

F. W. CORELL ET AL

BAGGAGE INSURANCE DEVICE

Filed Oct. 3, 1924    2 Sheets-Sheet 1

Fig. 1.

X.Y.Z. R.R. CO.
Form #2.
Transported subject to Tariff Regulations
JOHN DOE Gen. Bagg. Agt.
From CHICAGO, ILL.
To— LOS ANGELES, CAL.
JUNCTION POINT
Via. X.Y.Z          DENVER
U. & V.W.          OGDEN
R. S. & T.         DESTINATION

H 281463

X.Y.Z. R.R. Co.
PASSENGER'S DUPLICATE Form #2.
Transported subject to Tariff Regulations
JOHN DOE, Gen. Bagg. Agt.
From CHICAGO, ILL.
To— LOS ANGELES, CAL.
JUNCTION POINT
Via. X.Y.Z          DENVER
U. & V.W.          OGDEN
R. S. & T.         DESTINATION

H 281463

Issued by X.Y.Z. R.R. CO.
PASSENGER'S BAGGAGE INSURANCE CHECK
The ___ INSURANCE CO. in consideration of FIVE CENTS paid to the Transportation Co. for each multiple of $250.00 valuation, or fraction thereof, the gross amount being shown by the punchmark, does insure the holder of this check against loss or damage to baggage while in the care and custody of transportation Co's. under claim check, due to the perils of transportation as defined and limited in governing policy issued to the X.Y.Z. R.R. Co.
___ INSURANCE CO.
___ Pres.

250 | 500 | 750 | 1000 | 1250 | 1500

H 281463

Issued by X.Y.Z. R.R. CO.
From CHICAGO
To— LOS ANGELES
R.R. AUDITORS
INSURANCE

1500 | 1250 | 1000 | 750 | 500 | 250

H 281463    STUB

Issued by X.Y.Z. R.R. CO.
From CHICAGO
To— LOS ANGELES
INSURANCE CO.

250 | 500 | 750 | 1000 | 1250 | 1500

H 281463    STUB

Fig. 2.

A.B.C. HOTELS INC.
BAGGAGE & PARCEL CHECK
C 874

A.B.C. HOTELS INC.
AUDITOR'S STUB
C 874

250 | 500 | 750 | 1000 | 1250 | 1500

Issued by A.B.C. HOTELS INC.
BAGGAGE INSURANCE CHECK
The ___ INSURANCE CO. in consideration of— ect —
___ INSURANCE CO.
C 874        Pres.

1500 | 1250 | 1000 | 750 | 500 | 250

A.B.C. HOTELS INC.
OWNER'S CLAIM CHECK
NOTICE — Baggage remaining for 30 days may be sold for charges. This company will not be responsible for loss, damage or detention of articles checked for any amount in excess of $25.00
C 874    JOHN DOE  Manager

Fig. 3.

UNION DEPOT CO.
BAGGAGE & PARCEL CHECK
Leave this attached  K 46789
BAGGAGE CHECKED IN
"    "    OUT
K 46789

UNION DEPOT CO.
AUDITOR'S STUB

250 | 500 | 750 | 1000 | 1250 | 1500

K 46789

Issued by UNION DEPOT CO.
BAGGAGE INSURANCE CHECK
The ___ INSURANCE Co. in consideration of — ect —
___ INSURANCE CO.
K 46789      Pres.

1500 | 1250 | 1000 | 750 | 500 | 250

UNION DEPOT CO.
OWNER'S CLAIM CHECK
NOTICE — Baggage remaining for 30 days may be sold for charges. 10 cents for each 24 hours or fraction thereof, maximum charge for 30 days $1.00. This company will not be responsible for loss or damage of articles in excess of $25.00
K 46789    JOHN DOE  Baggage Agt.

INVENTORS
FLOYD W. CORELL
ARTHUR H. STOFFT
BY THEIR ATTORNEY
James F. Williamson Aug. 17, 1926. 1,596,237
F. W. CORELL ET AL
BAGGAGE INSURANCE DEVICE
Filed Oct. 3, 1924    2 Sheets-Sheet 2
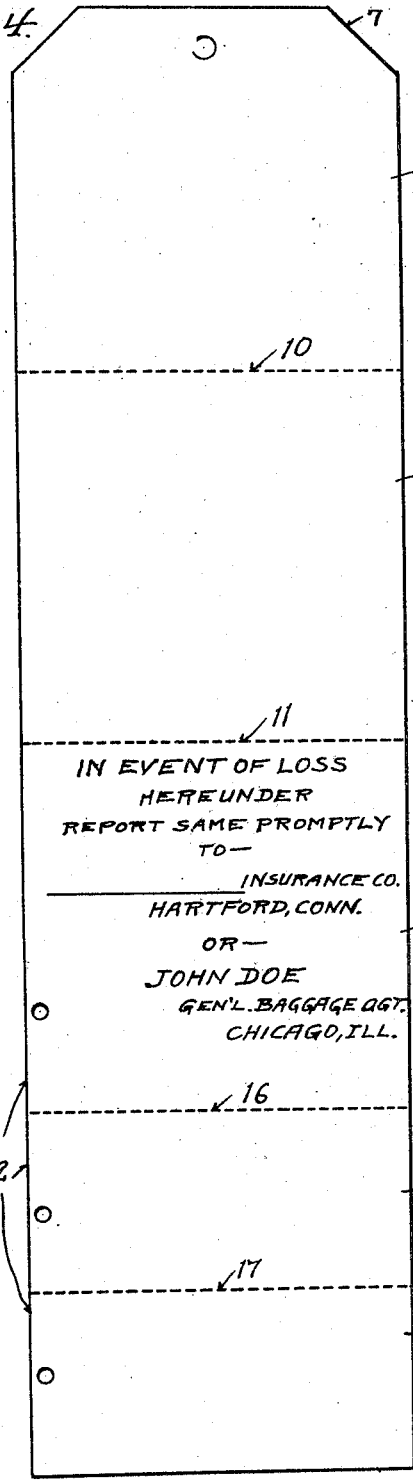
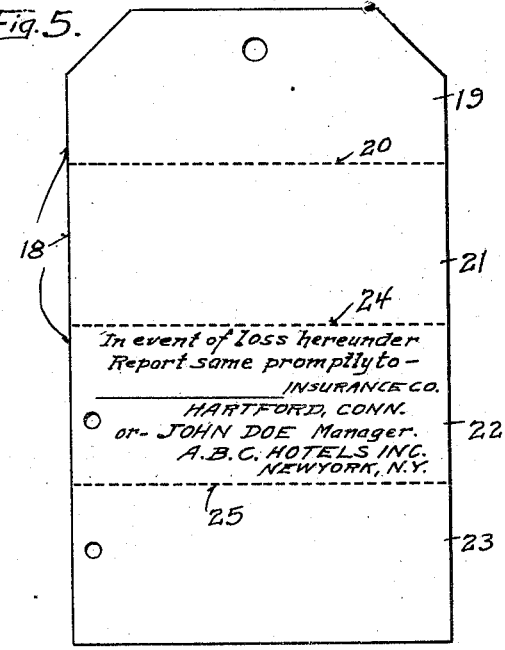
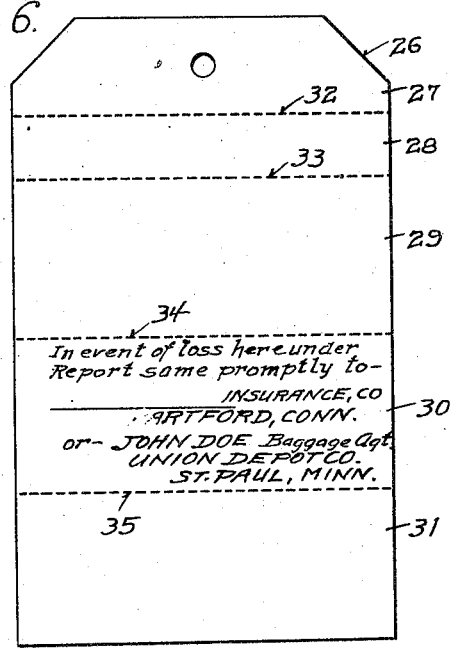
INVENTORS
FLOYD W. CORELL
ARTHUR H. STOFFT
BY THEIR ATTORNEY
James F. Williamson Patented Aug. 17, 1926.

1,596,237

UNITED STATES PATENT OFFICE.

FLOYD W. CORELL AND ARTHUR H. STOFFT, OF MINNEAPOLIS, MINNESOTA.

BAGGAGE-INSURANCE DEVICE.

Application filed October 3, 1924. Serial No. 741,375.

This invention relates to an insurance device and particularly to such a device for handling baggage insurance. Heretofore, persons checking baggage at hotels, terminals and public checking stations, or on railroads, steam ships, or other common carriers, while traveling, have been obliged to accept a very limited amount of liability by the company or concern handling the baggage. This amount usually varies from $5.00 to $100.00, while many single pieces of baggage are valued at a much larger amount and the device of the present invention is used with a method for insuring such baggage in an easy, rapid and convenient manner. With this device and method, a class of insurance at a low price and in a convenient form is offered to the public, which insurance has previously not been purchasable. In the past, wherever a chattel was insured it has been the custom to issue policies thereon of standard size and form. The handling and execution of these policies involved considerable expensive detail and a large amount of accounting.

It is an object of this invention to provide a device by means of which a novel, inexpensive and desirable form of baggage insurance can be purchased and conveniently and inexpensively handled.

It is a further object of the invention to provide such a device in the form of a coupon having thereon indicants for indicating the amount of insurance and preferably carrying a statement of contract making reference to a policy under which the baggage is insured, said coupon being detachably connected to a ticket issued by a party, to the holder of the coupon for a personal privilege in connection with said baggage, such as the privilege of having the baggage transported or stored.

It is a further object of the invention to provide such a device as above set forth comprising a coupon preferably in the form of readily separable sections which is detachably connected to a baggage check or ticket issued by a party to the holder of the coupon in connection with a personal privilege, said ticket or check and each of said sections bearing a common identifying number, said sections having thereon indicants indicating the amount of the insurance and one of said sections having thereon a stamp or character referring to a policy under which the insurance is sold.

It is more specifically an object of the invention to provide such a device as above mentioned comprising a check or coupon detachably connected to a railway baggage check, said coupon preferably comprising a plurality of readily separable sections, each of which and said check bear a common identifying number, and each of which sections have thereon indicants indicating the amount of said insurance, one of said sections having a statement or contract referring by number to the policy governing the insurance, one of said sections forming an auditor's stub and another of said sections forming a stub for the insurance company issuing the insurance.

These and other objects and advantages of the invention will be fully set forth in the following description made in connection with the accompanying drawings in which like reference characters refer to the same parts throughout the different views, and in which, Fig. 1 is a view of one side of a device embodying the present invention;

Fig. 2 is a view of one side of a different form of device;

Fig. 3 is a view of one side of a still different form of the device;

Fig. 4 is a view of the reverse side of the device shown in Fig. 1;

Fig. 5 is a view of the reverse side of the device shown in Fig. 2; and

Fig. 6 is a view of the reverse side of the device shown in Fig. 3.

Referring to the drawings, in Fig. 1 is shown a comparatively long and narrow piece of sheet material, such as heavy paper or card board and designated generally as 7. This member 7, in the form shown in Fig. 1, comprises an ordinary baggage check which is now issued by railroads to people checking baggage. This baggage check comprises a portion 8 and a portion 9 separated by the perforated line 10. The portion 8, in the modern practice, is retained by the railway company and the portion 9 is detached along the line 10 and given to the party checking the baggage. Both checks 8 and 9 usually have thereon the name of the railroad company, as shown in Fig. 1, a stamp that the baggage is transported subject to traffic regulations, the name of the general baggage agent and the place of departure and destination of the party. The checks also indicate via which railroad the passenger is to travel including any transfer or junction point. The particular form of baggage check forms no part of the present invention. The checks 8 and 9 both carry common identifying number which is represented in Fig. 1 by the characters "H 281463". Detachably connected to the check 9 by the perforated line or portion 11 is a coupon designated generally as 12 and which is composed of a plurality of sections 13, 14 and 15, said sections, preferably being readily separable or detachable along the perforated lines 16 and 17, respectively. The section 11 of the coupon carries a statement that it is used by the railway checking the baggage and is entitled "Passenger's baggage insurance check". This section also has printed thereon a statement or contract setting forth that the designated insurance company, in consideration of a certain amount paid to the transportation company for each multiple of a certain valuation, or fraction thereof, the gross amount of which is shown by the punch mark on the said section, will insure the holder against loss or damage to the baggage checked while in the care and custody of the transportation company and the statement or contract states that the baggage is insured under the claim check 6 or section 11 due to the perils of transportation defined in a certain governing policy which will be referred to by number and which is issued to the railway company checking the baggage, the section 13 having printed thereon the name of the insurance company and the signature of the president of said company. This section 13, as well as the sections 14 and 15 thus bear the same common identifying number used on the checks 8 and 9 which, as stated, is illustrated as "H 281463". The sections 13, 14 and 15 also have thereon a table comprising a series of graduated numerical indicants, one of which is adapted to be punched to indicate the amount of insurance and the statement "Amount of insurance" is placed adjacent each one of these tables. The said tables on checks 13 and 14 are reversely arranged and the table on check 15 is arranged in the same order as check 13. With this arrangement, the sections 13, 14 and 15 can be folded in superposed relation along the lines 16 and 17 and the same numerical indicant simultaneously punched out on all of said sections. In Fig. 1 the punched indicant is represented as $500.00.

The section 14 is provided to form a railway auditor's stub and carries, in addition to the matter already stated, the name of the railway company checking the baggage and the stations of departure and destination of the customer or passenger. The check 15 is adapted to form a stub for the insurance company and this section or check carries, in addition to the matter already set forth, the name of the railroad company checking the baggage, as well as the stations of departure and destination of the customer or passenger. The device 7 carries on its reverse side and especially on the reverse side of section 13, a statement that in event of loss hereunder, report same promptly to ———— insurance company, Hartford, Conn., or John Doe, general baggage agent at the station of departure, or at whatever city said agent may be located.

In using the device shown in Fig. 1, when the passenger checks his baggage at the usual baggage checking department, the railway official attending to the mater will make out the company's check 8 and the passenger's check 8 in the usual and ordinary way. Said official will then ask the passenger if he desires insurance. The cost of the insurance is placed at such a small figure that most people will very willingly insure their baggage. If he should desire $500.00 insurance which, according to the illustration in Fig. 1, would cost 10¢, the official will fold up the sections 13, 14 and 15 along the lines 16 and 17 at superposed relation and will punch out the numerical indicant 500, as indicated in Fig. 1. He will then detach the coupon 13 along the line 11 and will further detach the section 13 from the section 14 and will give the section 13 to the passenger or party checking the baggage. This forms the passenger's or insuree's receipt and claim check for his insurance. The official will retain sections 14 and 15, one of which he will place in the proper channel to be sent to the railway auditor and the other section 15 of which he will place in the proper channel to be sent to the insurance company. It will be noted that the section 13 retained by the passenger refers to a customer's policy which will specifically state the terms of the insurance and the length of time that the railway company is responsible therefor, as well as the methods of determining and proving damage. The railway company will, of course, receive a compensation for the insurance issued. All that will be necessary for the railway company to do will be to audit the stubs constituting the sections 14. The insurance company also will only have to audit the stubs formed by sections 15 in making a settlement with the railway. The amount due the railway company can, of course, be paid in any manner, as by cash, or the insurance company may furnish the baggage checks, thus relieving the railway company of this expense, the railway company, in turn, handling the insurance for the insurance company.

By use of the device, therefore, an extremely simple method is furnished for protecting the passenger with desirable insurance and for enabling the railway company and insurance company to account for the insurance with very little trouble or inconvenience.

In Fig. 2 is shown a device involving the invention especially adapted for such establishments as hotels and other similar places which now check baggage for patrons. The device shown in Fig. 2, indicated as a whole as 18, consists of a strip of paper or thin cardboard comprising a top ticket or section 19 adapted to be readily detached along the perforated line 20. This section or ticket 19 carries the name of the hotel and the words "Baggage and parcel check" and constitute the usual baggage or parcel check retained by the hotel company in checking parcels or baggage. The device 18 also comprises the sections 21, 22 and 23 readily separable along the perforated lines 24 and 25, respectively. The lower section 23 constitutes the usual customer's or patron's claim check for his baggage or parcel and also carries the name of the hotel and the title, "Owner's claim check". This claim check usually bears the statement or notations concerning the company's assumed responsibility for the baggage, as shown in Fig. 2. The specific form of the checks 19 and 23 forms no part of the present invention but these sections or checks may be of any ordinary or usual form. Adjacent the section 23 is a section 22 which carries the name of the hotel and also the title "Baggage insurance check". This section or check also carries a statement or contract that certain insurance is issued by a certain insurance company, which statement is substantially the same as that appearing on section 11 of the device shown in Fig. 1 and said section 22 also carries at the bottom of the statement the name of the insurance company and the signature of the president thereof. Adjacent the section 22 and also the section 19 is the section 21 adapted to form the auditor's stub. This section also carries the name of the hotel and the designation "Auditor's stub". The sections 21 and 22 have tables thereon and, as shown at one side thereof, comprising a series of graduated numerical indicants, which tables have adjacent thereto the statement "Amount of insurance". The tables shown are similar to those shown on sections 13 and 14 in the device of Fig. 1 and it will be seen that when sections 21 and 22 are folded in superposed relation about line 24, the same indicant can be simultaneously punched in said tables. It will be noted that all of the sections of the device 18 bear a common identifying number illustrated as "C 874". The device shown in Fig. 2 has printed on its reverse side, and especially on the reverse side of section 22, a statement similar to that printed on the reverse side of section 13, as shown in Fig. 4.

In using the device shown in Fig. 2, the hotel company will have an agreement with the insurance company. When a patron checks his parcels or baggage at the checking room the baggage operator will ask him if he wishes any insurance on the baggage and, if not, will merely tear off the usual claim check represented by section 23 and give this to the patron, placing the section 19 on the parcel and discarding the remainder of the device 18. If the patron desires insurance, the operator will fold section 21 on section 22 and punch out the amount of insurance at the corresponding indicant. He will then detach section 22 with section 23 and give this to the patron. The section 23 will constitute the ordinary claim check for the baggage and the section 22 will constitute the insurance check. This check, like the check or section 13 in Fig. 1, refers to an insurance policy which will contain the provisions under which the insurance is issued, such as time limit, etc. The operator will detach the section 21 and place the same in the proper channels to be forwarded to the hotel auditor. This stub will be audited to show the amount of insurance issued and a settlement can then be made between the hotel and the insurance company. It may be desirable to provide two auditors' stubs, such as illustrated in Fig. 1. By the use of the device shown in Fig. 2 it is seen that a convenient and desirable form of baggage insurance is provided for hotel patrons, which insurance can be very easily and conveniently handled by all parties.

In Fig. 3, a device 26 is illustrated, also comprising a piece of sheet material similar to the sheets in Figs. 1 and 2, illustrating the invention in the form to be used by terminals, depots, or similar establishments where baggage is now commonly checked. The device 26 comprises sections 27, 28, 29, 30 and 31 adapted to be readily separated along perforated lines 32, 33, 34 and 35. The sections 27 will carry the name of the union depot and constitute the usual baggage or parcel check retained by the checking company and is quite similar to the section 19 illustrated in Fig. 2. Terminal companies often charge for the parcels or baggage checked according to the time of storage and a section 28 is provided having marked thereon indications by means of which the time that the baggage was checked in and the time it was checked out may be inscribed on that section or check. The section 31 forms the owner's claim check for the baggage or parcel and carries the name of the terminal station or union depot company and a further statement, as shown in Fig. 3, concerning the liability assumed by said company. This section 30 carries the name of the terminal company or union depot company and is in all other respects similar to section 22 described in connection with Fig. 2. Section 29 also carries the name of the terminal company or union depot company and is in all other respects the same as section 21 described in connection with Fig. 2. The sections of member 26 all bear a common identifying number illustrated as being "K 46789". The sections 29 and 30 carry tables similar to those already described in connection with sections 13 and 14 in Fig. 1 and sections 21 and 22 in Fig. 2 adapted to be punched for indicating the amount of insurance. The device 26, and specifically the section 30 thereof, has printed on its reverse side a statement similar to that printed on the reverse side of section 22 shown in Fig. 2. This statement is shown in Fig. 6.

In using the device shown in Fig. 3, the operation will be similar to that already described in connection with the device shown in Fig. 2, except that the section 32 will be used to indicate the time that the baggage was checked in and will be delivered to the person checking the baggage so that when the baggage is claimed the time that it is checked out may be written thereon.

From the above description it is seen that applicant has invented a very simple and efficient means or device for use in handling baggage insurance. Such baggage insurance has not heretofore been obtainable. It has been proposed and has been more or less a common practice to sell personal insurance at the time the railway ticket was purchased, but such baggage insurance as disclosed and contemplated in the present invention is thought to be entirely novel. The device for handling this insurance is extremely simple and results in a very simple and efficient method of issuing and accounting for the insurance. The device of the invention can be used, as above set forth, by railways or baggage transporters, or by hotels, terminal depots, or any other institution or establishment where baggage parcels are checked or stored. As stated, the insurance is furnished at a very low rate and will, for this reason, doubtless be taken by a great majority of people with great willingness and benefit. The device of the invention can be easily and simply produced and the same constitutes quite an advance in the art.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. Means for providing insurance for baggage comprising a baggage check issued by a party handling baggage to a customer, said check having baggage insurance coupons detachably connected thereto, and each of said coupons having thereon indicants for the amount of insurance taken, the said indicants being adapted to be simultaneously punched to selectively indicate the amount of insurance taken, and one of said coupons bearing a statement or contract referring to said indicants and a certain insurance policy governing the insurance.

2. A baggage check having a detachable section for the issuance of insurance when checking baggage, said section comprising detachably connected coupons each bearing a common identifying character and consecutive indicants, said indicants being so arranged on said coupons as to register when said coupons are folded whereby said indicants may be simultaneously punched, and one of said coupons bearing a statement or contract referring to said indicants and a certain insurance policy governing the insurance.

3. Means for providing baggage insurance comprising the customary baggage check and a baggage insurance section detachably connected thereto, said section comprising a plurality of separable coupons, each coupon and said check carrying a common identifying character, said coupons also carrying graduated series of numerical indicants, one of which indicants on each coupon is adapted to be punched for indicating the amount of insurance, one of said coupons carrying a contract referring to said indicant and to a certain insurance policy, said coupon being adapted to be retained by the party checking the baggage, another coupon being marked as an auditor's stub to be sent to the auditor of the party handling the baggage, and another coupon being marked as the insurance company's auditor's stub and adapted to be sent to the insurance company.

In testimony whereof we affix our signatures.

FLOYD W. CORELL.
ARTHUR H. STOFFT.